March 6, 1962  F. G. STEWART  3,023,856
RAILWAY BRAKE BEAM GUIDE
Filed Dec. 5, 1958  2 Sheets-Sheet 1

Inventor
Frederick G. Stewart
By Rodney Bedell
atty

March 6, 1962  F. G. STEWART  3,023,856
RAILWAY BRAKE BEAM GUIDE
Filed Dec. 5, 1958  2 Sheets-Sheet 2
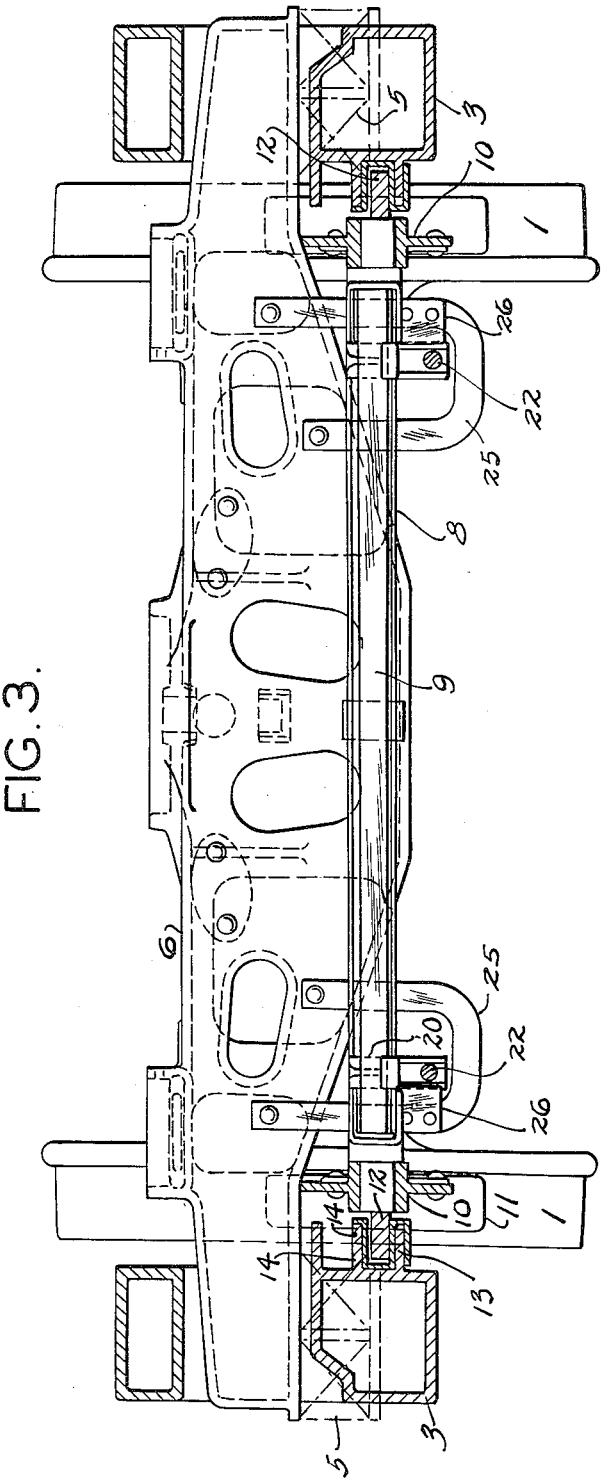
Inventor
Frederick G. Stewart
By Rodney Bedell
atty.

United States Patent Office
3,023,856
Patented Mar. 6, 1962

3,023,856
RAILWAY BRAKE BEAM GUIDE
Frederick Green Stewart, Washington, D.C., assignor, by mesne assignments, to American Seal-Kap Corporation of Delaware, New York, N.Y., a corporation of Delaware
Filed Dec. 5, 1958, Ser. No. 778,513
4 Claims. (Cl. 188—210)

The invention relates to railway vehicle truck and brake gear assemblies including brake beams of the hangerless type, and comprises the combination of a pair of beams slidably mounted on brackets on the truck side frames and guide support rods extending from one beam to the other and controlling relative movements of the beams and adjacent truck parts.

Hangerless brake beams of the type referred to usually include rigid projections from the brake heads supported on flanges or shelves extending inboard from the truck side frames. Sometimes such beam end projections become disengaged from the supporting shelf and the beam may fall to the rail which may cause a derailment or other damage. Such a disengagement is most likely to occur when the opposing elements of the bolster and side frames, journals and journal bearings, and other associated parts become excessively worn.

After many applications of the brakes, the brake beam supports may become inaccurate or ineffective due to uneven wear of the projection itself, or its supporting shelf, or because the beam is not evenly balanced or because pressure is applied unevenly to the upper and lower portions of the brake shoes. Sometimes the projections at one end of the beam may wear faster than the projections at the other end of the beam.

The main objects of the invention are to maintain the brakes in a normal position for clearing the wheels, when not functioning, and to prevent accidental dropping of the beam to the rail, and to hold the beam against undue tilting and resulting wear of the supporting and supported elements.

In the accompanying drawings illustrating a selected embodiment of the invention:

FIGURE 3 is a transverse vertical section through the truck on line 3—3 of FIGURE 1.

FIGURE 4 is a detail elevation of a different form of the beam connection guard.

Figure 1:
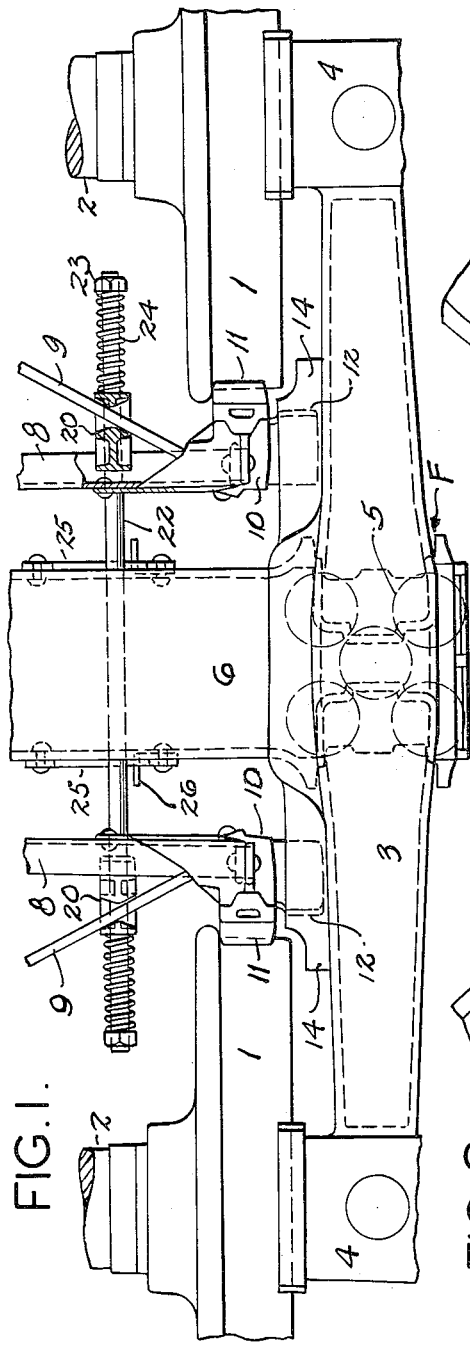
FIGURE 1 is a top view of one longitudinal half of a four wheel truck equipped with hangerless beams slidably supported upon the truck side frames, the ends of the truck being broken away to make possible the drawing on a larger scale.

The truck includes the usual wheels 1, axles 2, side frames 3, including journal boxes 4 mounted on the axle journals. Bolster springs 5 are seated on the lower chords of the side frames and mount the bolster 6 which projects through windows 7 in the side frame. At each side of the bolster is a brake beam of truss formation including a channel shape compression member 8 and a flat bar tension member 9 converging at their ends and mounting brake heads 10 which carry renewable shoes 11. Each brake head has an outwardly extending projection or paddle 12 received between inboard flanges or shelves 13, 14 integral with the side frame. The paddle has a flat bottom face elongated lengthwise of the truck and slidable along lower shelf 13 lengthwise of the truck when the brakes are applied and released.

Carried on the brake beam near each end is a bracket 20 extending between and seated against the adjacent portions of the beam compression and tension members 8, 9. The bracket includes a sleeve 21 below the beam with its axis extending horizontally transversely of the beam. A guide and carrier rod 22 extending lengthwise of the truck is slidably mounted in the aligned sleeves 21 of the two beams at opposite sides of the bolster. Nuts 23 on the ends of rod 22 form seats for the outer ends of compression springs 24 and retain the springs on the rods. The inner ends of the springs are seated against portions of sleeves 21.

Stirrups 25 secured to and depending from bolster 6 underlie guide-carrier rods 22 and form therewith safety devices preventing a brake beam from dropping to the rail in the event of breakage of a paddle extension 12 or its displacement from support shelf 13. Preferably each stirrup is positioned lengthwise of the bolsters so that one of its upright legs is closely adjacent to, but normally clears, the guide-carrier rod 22 passing through the stirrup and mounts a separate wear element 26 of hardened metal opposing the guide-carrier rod. This arrangement limits the movement of the brake beam transversely of the truck relative to the bolster and since the ends of the bolster have sliding fits F in the truck side frames, the spacing of the beam ends relative to the side frames is controlled by the stirrups. The clearance between rods and the nearest stirrup legs is less than the distance the paddles overlap the shelves 13, 14 transversely of the truck and the beam may not shift lengthwise so as to disalign and disengage one of its paddles 12 and the support shelf. This would not avoid, but would restrict, the possible relative displacement of the beam and its normal support due to spreading of the side frames.

Irrespective of the safety feature just described, the rod assembly with the bracket sleeves on the spaced beams tend to hold the beams horizontal and avoid their tilting vertically on the supporting shelves and inclining horizontally about their longitudinal axes with consequent uneven wear of the beam paddles 12 and uneven wear of the brake shoes. Springs 24 accommodate the sliding of the rod and brake beam brackets relative to each other and contribute to the return of the brake beams to their normal position when the brake cylinder pressure is released.

Figure 2:
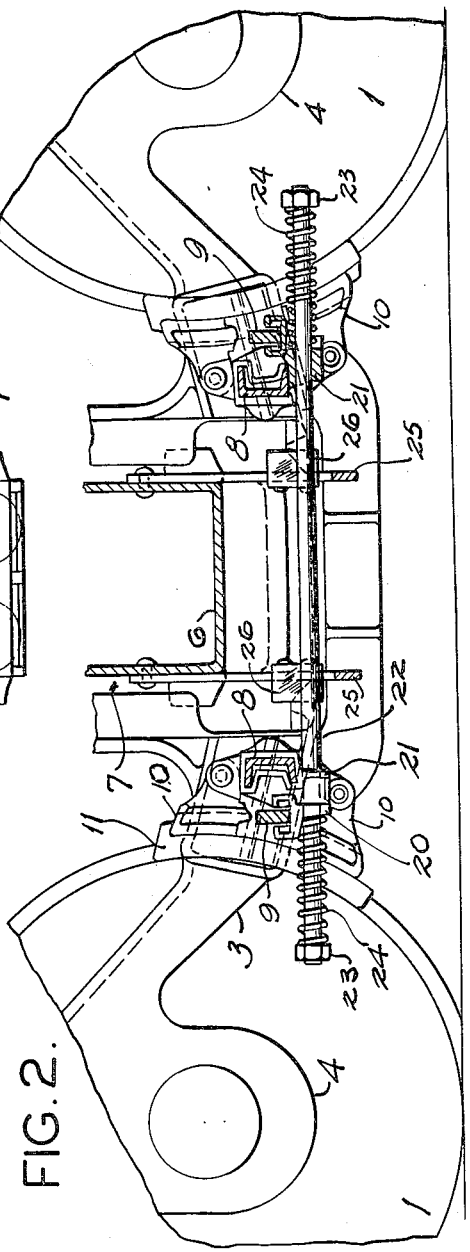
FIGURE 2 is a vertical longitudinal section through portions of the bolster and brake beams on a vertical plane adjacent to the wheels and looking outboard of the truck.

FIGURE 4 shows another form of safety stirrup 30 with its upper ends secured to bolster 31 similar to the upper ends of stirrup 25 but the inboard leg 32 of the stirrup is offset horizontally to provide a shoulder 33 adjacent the guide-carrier rod 34. The stirrup is formed of a flat bar similar to stirrup 25 but the bar is twisted 90° beneath the bolster to provide a flat surface opposing the rod. The stirrup and rod function similar to that shown in FIGURES 1-3 but each stirrup resists inboard movement of the adjacent rod as distinguished from resisting the outboard movement of the rod as shown in FIGURE 3.

The details of the structure may be varied without departing from the spirit of the invention and the exclusive use of those modifications coming within the scope of the claims is contemplated.

I claim:

1. In a railway truck and brake gear assembly including wheels and axles and side frames mounted thereon and brake beams spaced apart lengthwise of the truck with shoes applicable to the wheels, the combination of inboard shelves on the side frames adjacent the ends of said beams and elongated lengthwise of the truck, rigid extensions on the ends of the brake beams with flat lower faces slidably mounted on said shelves, a bracket fixed on each brake beam near each side frame and including an elongated sleeve with its axis disposed horizontally lengthwise of the truck, guide rods extending lengthwise of the truck between the brackets at each side of the truck and slidably mounted in said bracket sleeves and holding the brake beams against tilting lengthwise of the truck on said shelves, and stirrup-like safety devices associated with respective guide rods and supported from the side frames and extending at the sides of and underlying respective guide rods, each stirrup-like safety device having an upright leg closely adjacent to the associated guide rod and provided with a separate wear element for engaging the guide rod upon predetermined lateral movement of the associated guide rod, said safety devices limiting the movements of the guide rods and the brackets and the beams downwardly and transversely of the wheels.

2. In a railway truck and brake gear assembly according to claim 1, springs mounted on each guide rod and distorted between the beams and guide rods to urge the beams toward each other along the supporting shelves.

3. In a railway truck and brake gear assembly including wheels and axles and side frames mounted thereon and a bolster extending between and spring-supported on said side frames and brake beams at opposite sides of the bolster and provided with brake heads and shoes, the combination of rigid paddles extending from the ends of the brake beams, inboard shelves on the side frames supporting the brake beams by said paddles for movement to and from the wheels, guide rods extending lengthwise of the truck beneath the bolster, sleeves fixed on said brake beams elongated transversely of the beams and slidably fitting said rods whereby the beams are held against tilting in a vertical plane lengthwise of the truck and their brake shoes are held concentric with the wheels and their paddles are held substantially parallel to the side frame shelves, safety devices suspended from said bolster, each of said safety devices being disposed adjacent to an associated rod, said safety devices each including a portion disposed laterally of the associated rod and being positioned more closely adjacent to the associated rod than the distance the adjacent paddle overlaps the supporting shelf for that end of the beam transversely of the truck, thereby preventing movement of the beams transversely of the truck sufficient to withdraw the beam paddles from the supporting shelves, each of said safety devices also including a portion positioned beneath the associated rod for supporting the beams in the event of failure of a shelf and paddle support.

4. In a railway truck and brake gear assembly including wheels and axles and side frames mounted thereon and a bolster extending between and spring supported on said side frames and brake beams at opposite sides of the bolster and provided with brake heads and shoes, the combination of rigid paddles extending from the ends of the brake beams, inboard shelves on the side frames supporting the brake beams by said paddles for movement to and from the wheels, guide rods extending lengthwise of the truck beneath the bolster, sleeves fixed on said brake beams elongated transversely of the beams and slidably fitting said rods whereby the beams are held against tilting in a vertical plane lengthwise of the truck and their brake shoes are held concentric with the wheels and their paddles are held substantially parallel to the side frame shelves, stirrups suspended from said bolster and underlying said rods and forming therewith safety devices for supporting the beams in the event of failure of a shelf and paddles support, the stirrups each including an upright leg portion positioned more closely adjacent to the rod the stirrup underlies than the distance the adjacent paddle overlaps its supporting shelf for that end of the beam transversely of the truck, thereby preventing movement of the beams transversely of the truck sufficient to withdraw the beam paddles from the supporting shelves.

References Cited in the file of this patent

UNITED STATES PATENTS

| | | |
|---|---|---|
| 2,408,015 | Busse | Sept. 24, 1946 |
| 2,459,323 | Kass | Jan. 18, 1949 |
| 2,746,576 | Lewis et al. | May 22, 1956 |
| 2,866,523 | Baselt | Dec. 30, 1958 |
| 2,954,105 | Massey | Sept. 27, 1960 |